US008411349B2

(12) United States Patent
Mitomi et al.

(10) Patent No.: US 8,411,349 B2
(45) Date of Patent: Apr. 2, 2013

(54) OPTICAL MODULATOR

(75) Inventors: Osamu Mitomi, Machida (JP);
Yasunori Iwasaki, Kitanagoya (JP);
Yuji Hori, Nagoya (JP); Kenji Aoki,
Nagoya (JP); Jungo Kondo,
Nishikamo-Gun (JP)

(73) Assignee: NGK Insulators, Ltd., Nagoya (JP)

( * ) Notice: Subject to any disclaimer, the term of this patent is extended or adjusted under 35 U.S.C. 154(b) by 128 days.

(21) Appl. No.: 13/022,896

(22) Filed: Feb. 8, 2011

(65) Prior Publication Data

US 2011/0157673 A1  Jun. 30, 2011

Related U.S. Application Data

(63) Continuation of application No. PCT/JP2009/060976, filed on Jun. 10, 2009.

(30) Foreign Application Priority Data

Aug. 22, 2008 (JP) ................................. 2008-213922

(51) Int. Cl.
*G02F 1/01* (2006.01)
*G02F 1/03* (2006.01)
*H04B 10/04* (2006.01)

(52) U.S. Cl. ........ 359/279; 359/237; 359/238; 359/245; 359/254; 359/315; 398/182; 398/183; 398/188; 398/200

(58) Field of Classification Search .................. 359/237, 359/238, 240, 245, 248, 276, 279, 254; 385/2, 385/3, 7, 11, 14, 40; 398/182, 183, 185, 398/187, 200; 372/26, 29.013
See application file for complete search history.

(56) References Cited

U.S. PATENT DOCUMENTS

| 5,040,865 | A | * | 8/1991 | Chen et al. ......................... 385/2 |
| 5,278,923 | A | * | 1/1994 | Nazarathy et al. ................. 385/3 |
| 6,192,167 | B1 | | 2/2001 | Kissa et al. |
| 6,385,353 | B1 | * | 5/2002 | Boyne et al. ....................... 385/2 |
| 6,678,428 | B2 | * | 1/2004 | Seino et al. ....................... 385/2 |
| 6,999,223 | B2 | * | 2/2006 | Seino et al. ................... 359/254 |
| 7,177,549 | B2 | * | 2/2007 | Matsushima et al. ......... 398/182 |
| 8,078,015 | B2 | * | 12/2011 | Sugiyama ......................... 385/3 |
| 8,218,914 | B2 | * | 7/2012 | Kissa ............................... 385/2 |

(Continued)

FOREIGN PATENT DOCUMENTS

| JP | 11-231358 A1 | 8/1999 |
| JP | 2003-233043 A1 | 8/2003 |

(Continued)

OTHER PUBLICATIONS

Japanese Office Action dated Jan. 15, 2013.

*Primary Examiner* — Loha Ben
(74) *Attorney, Agent, or Firm* — Burr & Brown

(57) ABSTRACT

An optical modulator includes an optical modulation substrate, an electrical length adjusting substrate, a package containing the substrates, and a plurality of input ports for inputting high frequency electrical signals. The optical modulation substrate includes a substrate body made of an electro-optic material, a ground electrode and a plurality of signal electrodes provided on the substrate body, optical waveguides propagating lights interacting with the signal electrodes, respectively, and electrode input ports inputting the high frequency electrical signals into the signal electrodes, respectively. The signal electrode includes an interacting part, an input end part provided between the electrode input port and interacting part, and a terminal part. The electrical length adjusting substrate includes conductive lines connected to the input ports for inputting the high frequency electrical signals, respectively. The conductive lines have electrical lengths different from each other for adjusting the phase differences among the ports.

7 Claims, 6 Drawing Sheets

| U.S. PATENT DOCUMENTS | | | | FOREIGN PATENT DOCUMENTS | | |
|---|---|---|---|---|---|---|
| 2001/0046341 A1 | 11/2001 | Nakabayashi | | JP | 2003-233044 A1 | 8/2003 |
| 2002/0186912 A1 | 12/2002 | Seino et al. | | JP | 2003-289208 A1 | 10/2003 |
| 2003/0151792 A1 | 8/2003 | Kaitoh et al. | | JP | 2004-029498 A1 | 1/2004 |
| 2003/0151793 A1 | 8/2003 | Sugiyama et al. | | JP | 2004-093606 A1 | 3/2004 |
| 2004/0001672 A1 | 1/2004 | Tanaka | | JP | 2004-185040 A1 | 7/2004 |
| 2004/0095628 A1 | 5/2004 | Seino et al. | | JP | 2004-318113 A1 | 11/2004 |
| 2004/0264835 A1 | 12/2004 | Matsushima et al. | | JP | 2005-331531 A1 | 12/2004 |
| 2007/0081766 A1 | 4/2007 | Aoki et al. | | | | |
| 2010/0266234 A1* | 10/2010 | Kinpara et al. | 385/2 | * cited by examiner | | |

OPTICAL MODULATOR

TECHNICAL FIELD

The present invention relates to an optical modulator.

BACKGROUND OF THE INVENTION

As the developments of multi-media, broad band telecommunication systems have been increasingly demanded. It has been in practical use an optical transmission system operating on a frequency over 10 GB/s and demanded a new system operating on a higher frequency. An LN optical modulator is used as a device for modulating an electrical signal (microwave signal) of 10 GB/s or higher to light.

It is necessary to mount such an optical modulator in a package for connecting it to an outer high frequency electric source. As a prior art document disclosing such electrical mounting structure of the optical modulator, it is described a method of directly connecting a connector pin to the modulator without intervening a high frequency intermediate substrate, in FIG. 1 of Japanese Patent No. 3824265B.

According to an optical transmitter using an optical modulator having two or more ports whose electrical lengths are not adjusted, it is problematic to have a skew among the input ports (timing of the signals). It is thus necessary to provide an outer device for adjusting the timing for each channel.

For example, according to Japanese Patent Publication No. 2003-233044A, the modulator chip is connected by means of wire bondings, and a high frequency connector is connected with a solder. Since the timing of the signals among a plurality of input ports are not adjusted within such a device, a variable phase shifter is connected to each channel to adjust the timing among the channels.

According to Japanese Patent Publication No. 2004-185040A, a signal electrode is considerably bent between an interacting part and input port of an optical modulator, so that the skew is adjusted among the input ports. In this case, it is unnecessary to adjust the timing of the high frequency electrical signals with the outer phase shifter.

SUMMARY OF THE INVENTION

According to a method of providing the variable phase shifter in the outside of the package, the phase shifter is large with respect to the size of the optical modulation substrate. The propagation loss is thus large so as to induce the deterioration of the microwave characteristics and, in particular, narrows the modulation band. Therefore, even when the phase compensation is performed at room temperature, as the ambient temperature is considerably changed, the phase of each channel is also changed so that the difference of the delay among the channels becomes large.

According to Japanese Patent Publication No. 2004-185040A, a signal electrode is meandered or bent between an interacting part and input port of the optical modulation substrate to adjust the skew. In this case, the propagation loss in the signal line becomes large inducing the deterioration of the microwave characteristic so that the modulation band becomes narrower. Then, according to this type of optical modulator, it is proved that the differences of the delay among the channels are considerably different with each other for the manufacturing lots, due to minute production error and deviation.

An object of the present invention is, in an optical modulator having a plurality of channels for inputting high frequency electrical signals, to prevent the differences of the delays among the channels due to the change of ambient temperature and among different production lots.

The present invention provides an optical modulator that includes an optical modulation substrate, an electrical length adjusting substrate, a package containing the substrates and a plurality of input ports for inputting high frequency electrical signals. The optical modulation substrate includes a substrate body made of an electro-optic material, a plurality of signal electrodes provided on the substrate body, optical waveguides propagating lights interacting with the signal electrodes, respectively, and electrode input ports inputting the high frequency electrical signals into the signal electrodes, respectively. Each signal electrode includes an interacting part interacting with the optical waveguide, an input end part provided between the electrode input port and the interacting part, and a terminal part provided downstream of the interacting part. The electrical length adjusting substrate includes conductive lines connected to the input end parts and the input ports for inputting the high frequency electrical signals, respectively. The conductive lines have electrical lengths different from each other for adjusting the phase differences of the high frequency electrical signals at each electrode input part.

According to the method of providing a variable phase shifter in the outside of a package for adjusting the skew, after the phase is compensated at room temperature, the phase for each channel is changed and the difference of the delay among the channels is increased as the ambient temperature is considerably changed. According to the present invention, the skew adjusting is performed by means of the optical modulation substrate and electrical length adjusting the substrate inside of the input ports, instead of the variable phase shifter in the outside of the input ports of the package. Therefore, even when the ambient temperature is changed, it is possible to reduce the difference of delay among the channels at the signal application end of the interacting part.

Further, according to Japanese Patent Publication No. 2004-185040A, a signal electrode is considerably meandered and bent between an interacting part and input port of an optical modulator so that the skew is adjusted. In this case, however, the delay in the channels are proved to be considerably different from each other among different production lots. The inventors have investigated the cause of this phenomenon and found that the microscopic shape of the signal electrode on an optical modulator substrate tends to be deviated when the signal electrode is curved or meandered. It is necessary that the signal electrode has a certain thickness for the velocity matching of microwave and light wave in the interacting part. The formation of such a thick film inevitably tends to result in a deviation of the thickness and the width. It is considered that such a deviation of the microscopic shape of the signal electrode results in the deviation of the difference of the delay among the channels. This kind of investigations has been presented by the inventors in the first time.

Based on the above speculations, the inventors tried to provide an electrical length adjusting substrate, separated from the optical modulation substrate, on which conductive lines are provided corresponding to the channels, respectively. Then, it was tried to adjust the skew in each channel by controlling the electrical length of each conductive line. As a result, it is found that, even when the ambient temperature is changed, the difference of the delay among the channels is not substantially changed and, in addition to this, the deviation of the difference of the delay among the channels for different production lots is reduced.

DETAILED DESCRIPTION OF THE INVENTION

The optical modulator of the present invention is not limited, as far as it is capable of modulating the property of light, and includes optical intensity and phase modulators. The optical intensity modulator may be an optical amplitude modulator utilizing a Mach-Zehnder type optical waveguide or an amplitude modulator such as SSB. The optical phase modulator means a device of applying phase modulation on incident light and of drawing phase-modulated signal from the emitted light. The kind of the phase modulator is not particularly limited and may be operated on various phase modulation systems such as DQPSK, DPSK.

According to a preferred embodiment, the optical phase modulator includes a plurality of optical phase modulating parts. According to this embodiment, preferably, a first or second ground electrode of one of the optical phase modulating parts forms a common ground electrode with a first or second ground electrode of the adjacent phase modulating part. By forming the common ground electrode, it is possible to reduce the size required for the optical modulator chip and to assist the miniaturization of the chip.

Systems for the phase modulation using a plurality of the phase modulating parts is not particularly limited, and include various phase modulation systems such as DQPSK (Differential Quadrature Phase Shift Keying), DPSK (Differential Phase Shift Keying) and the like. Each modulating system itself is known.

Figure 1:
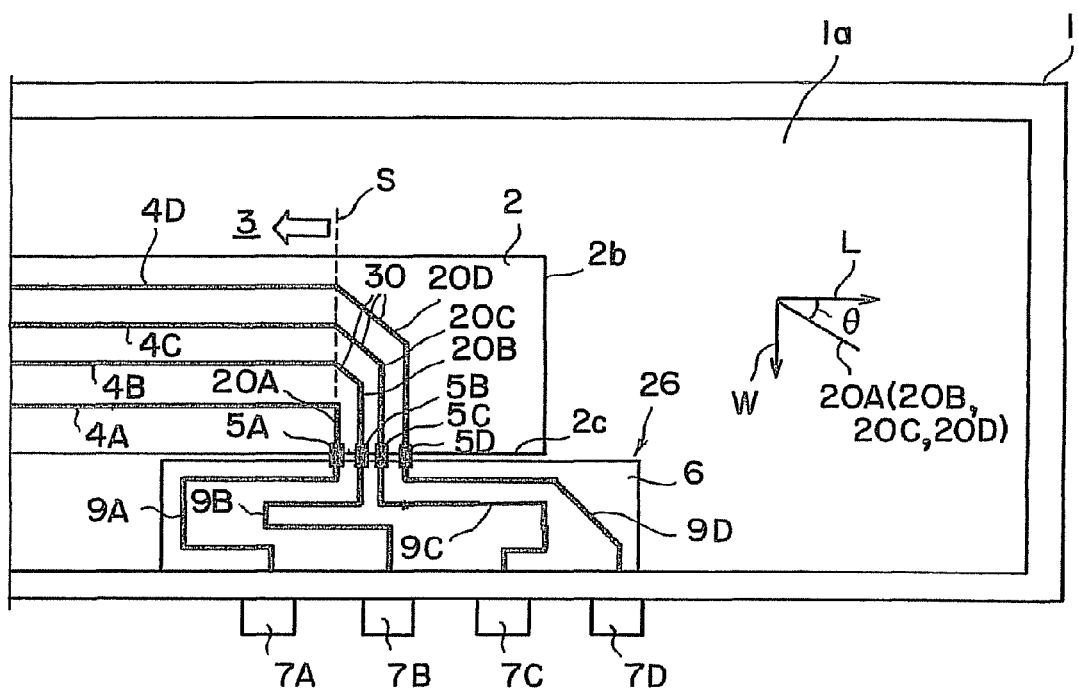
FIG. 1 is a diagram schematically showing an input-side end of an optical modulation substrate 2, an electrical length adjusting substrate 26, a package 1 and high frequency electrical signal input ports 7A to 7D.
Figure 2:
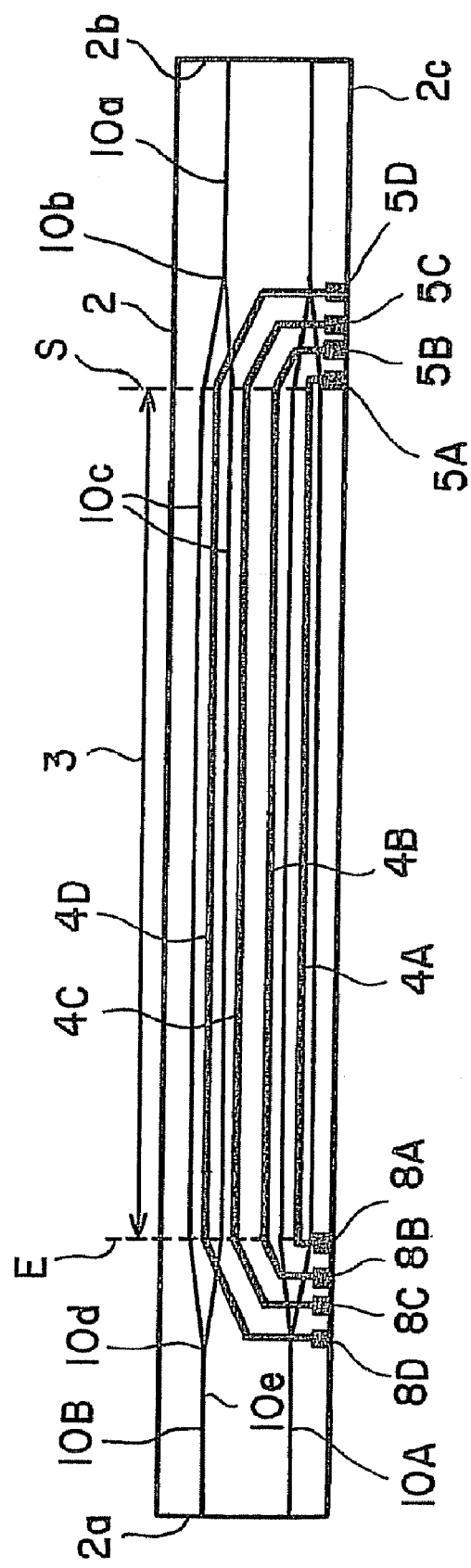
FIG. 2 is a plan view schematically showing the whole of the optical modulation substrate 2.
Figure 3:
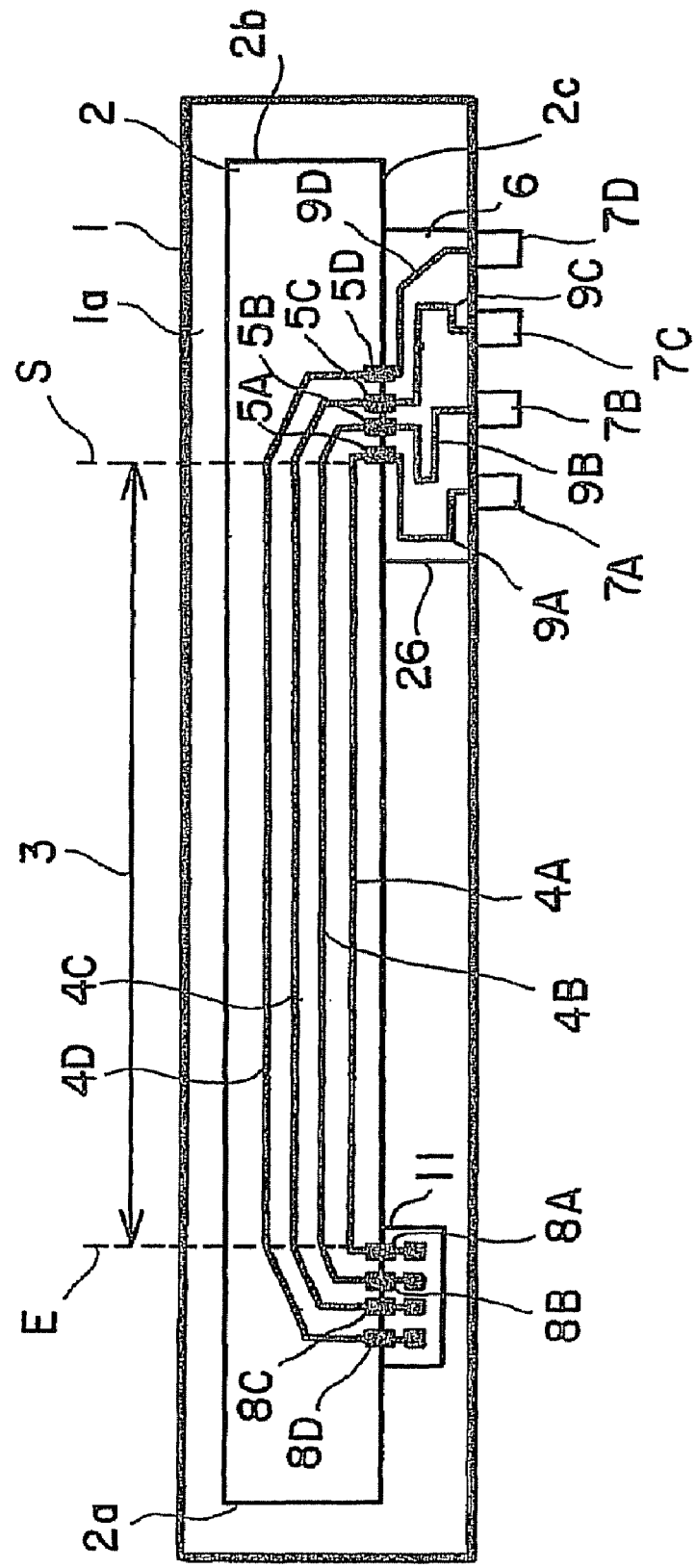
FIG. 3 is a plan view schematically showing the whole of the optical modulation substrate 2, electrical length adjusting substrate 26, package 1 and high frequency electrical signal input ports 7A to 7D.

FIGS. 1 to 3 relate to an embodiment of the present invention. FIG. 1 is a diagram schematically showing an input-side end of an optical modulation substrate 2, an electrical length adjusting substrate 26, a package 1 and ports 7A to 7D for radio frequency electrical signals. FIG. 2 is a plan view schematically showing the whole of the optical modulation substrate 2. FIG. 3 is a plan view schematically showing the whole or the optical modulation substrate 2, electrical length adjusting substrate 26, package 1 and ports 7A to 7D for inputting radio frequency signals.

The optical modulator of the present example is of DQPSK type. For example, as shown in FIG. 2, two lines of Mach-Zehnder type optical waveguides 10A and 10B are formed on a surface of a substrate body 2 having a planar shape. The optical waveguides constitute independent optical modulating parts. Each optical waveguide includes an input part 10a, a dividing part 10b, interacting parts 10c, a combining part 10d and an emitting part 10e. As a result, four lines of the interacting parts 10c are formed on the substrate body 2. 2b represents an input-side end face, 2a represents an emitting-side end face and 2c represents a high frequency signal-side end face.

The signal and ground electrodes are formed corresponding with the interacting parts 10c, respectively. Gaps are provided between the adjacent signal and ground electrodes, respectively. The interacting parts 10c are provided in the gaps, respectively, in a plan view. 3 represents the interacting part, S represents a starting point of the interacting part 3, and E represents a terminal of the interacting part 3.

FIG. 2 shows signal electrodes 4A, 4B, 4C and 4D. Each signal electrode includes the interacting part 3, input part and terminal part. The terminal parts are connected to terminal ports 8A, 8B, 8C and 8D, respectively. As shown in FIG. 3, the terminal ports 8A to 8D are connected to terminal resistances 11, respectively.

As shown in FIG. 3, the optical modulation substrate 2 and electrical length adjusting substrate 26 are contained and fixed in a space 1a in the package 1. The ports 7A, 7B, 7C and 7D for inputting high frequency electrical signals are fitted to the package 1. Each port is connected to a high frequency electrical source (not shown).

As shown in FIG. 1, input end parts 20A, 20B, 20C and 20D are formed between the starting point of the interacting parts of the signal electrodes and the electrode input ports 5A, 5B, 5C and 5D, respectively. Conductive lines 9A, 9B, 9C and 9D, corresponding to the respective channels, are formed on a conductive line substrate 6. The conductive lines are connected to the respective ports 7A to 7D and the corresponding ports 5A to 5D. The connecting method is not limited, and includes wire bonding.

According to the present invention, it is not necessary to provide a variable phase modulator in the outside of the package. Further, in the optical modulation substrate 2, the electrical lengths of the input end parts 20A to 20D are different from each other and the phases are not adjusted. That is, the electrical length of the input end part 20A of the signal electrode 4A near the high frequency-side end face 2c is relatively short and that of the input end part 20D of the signal electrode 4D distant from the end face 2c is relatively long. Therefore, when the phases of the signals at the respective input ports 5A to 5D are matched, the phases at the starting terminal S of the interaction is not matched with each other. By adjusting the electrical lengths of the conductive lines 9A, 9B, 9C and 9D on the conductive line substrate 6, it is possible to match the electrical lengths from the respective ports 9A to 9D to the starting terminal S of the interaction so that the electrical signals can be applied on the interacting parts at the same phase.

Figure 4:
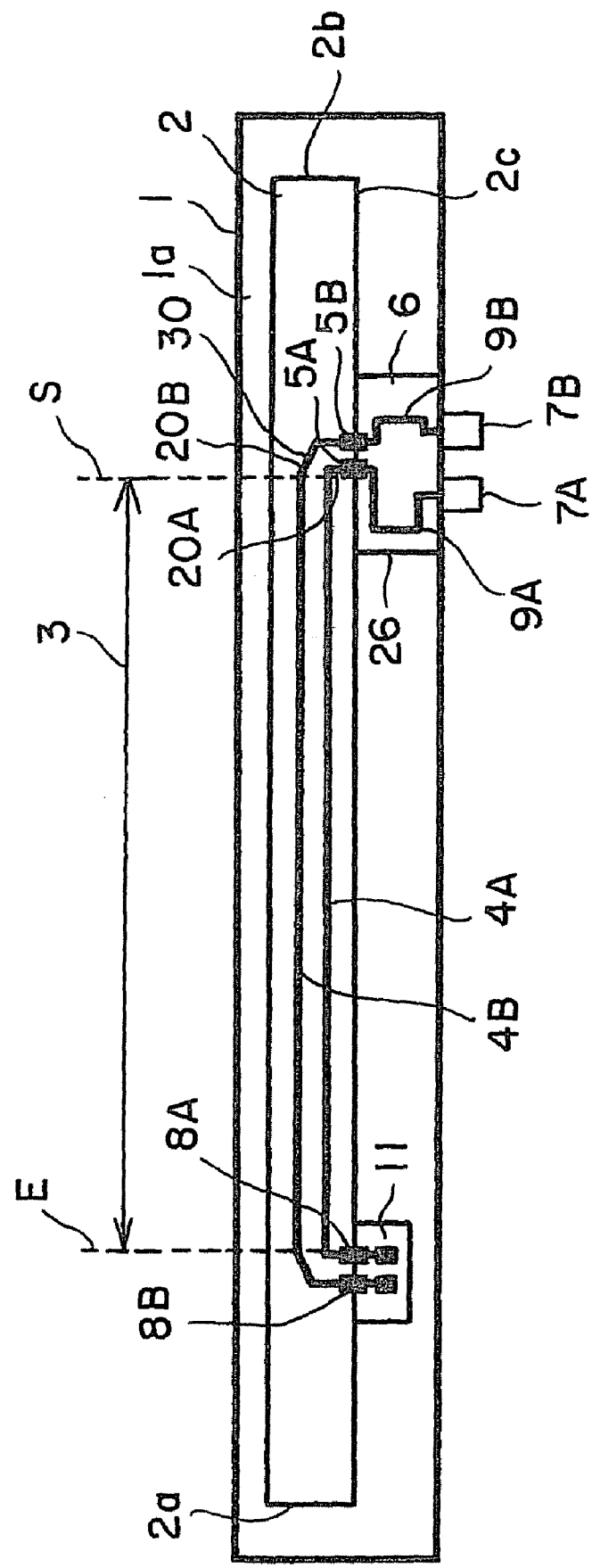
FIG. 4 is a schematic view showing an optical modulator according to another embodiment of the present invention.

An optical modulator of FIG. 4 is an example using a two-channel type signal electrode pattern. According to the example, the two-channel type signal electrodes 4A and 4B are formed on the optical modulation substrate 2, and ground electrodes are provided for the signal electrodes, respectively. The conductive line substrate 6 is provided on the side of the side face 2c of the optical modulation substrate, and the conductive lines 9A and 9B are formed on the conductive line substrate 6. One ends of the conductive lines 9A and 9B are connected to the ports 5A and 5B for the signal electrodes of the channels, respectively, and the other ends are connected to the input ports 7A and 7B, respectively.

In the optical modulation substrate 2, the electrical lengths of the input end parts 20A and 20B are different from each other and the phases are not adjusted. That is, the electrical length of the input end part 20A of the signal electrode 4A near the high frequency-side end face 2c is short and that of the input end part 20B of the signal electrode 4B distant from the end face 2c is relatively long. Therefore, when the phases of the signals at the electrode input ports 5A, 5B are matched with each other, the phases at the starting terminal S are not matched. Here, by adjusting the electrical lengths of the conductive lines 9A and 9B on the conductive line substrate 6, the electrical lengths from the input ports 7A and 7B to the starting terminal S for the interaction can be matched with each other so that the electrical signals can be applied on the interacting part 3 at the same phase.

It is desirable that the conductive line substrate is made of a material having a small dielectric loss (tan δ). By using a material of a low dielectric loss, it is possible to reduce the loss of the microwaves in the signal lines while widening the modulation band. Particularly, in the case that the thin-plate type conductive line substrate is adhered to a separate supporting body with a layer of a resin of a low dielectric constant, the dielectric loss is increased by the resin layer having a low dielectric constant. Therefore, by making the conductive line substrate with the material of a low dielectric loss, the advantageous effects are more considerable. According to a preferred embodiment, the conductive line substrate is made of an isotropic material. An isotropic material means a material whose refractive index for microwave is the same with respect to any direction. In this case, the electrical lengths in the conductive line substrate can be easily designed.

Such isotropic material of the substrate having a low dielectric constant includes alumina, a glass/epoxy composite laminate (FR-4), Teflon (PTFE), and polyphenylene ether (PPE). A material, however, may be used without particular limitation, as long as a material having good high frequency characteristics is used.

According to a preferred embodiment, typically in the case that an X-cut lithium niobate substrate is used, the substrate body has refractive indices for the microwaves in the longitudinal and width directions of the substrate body, the refractive indices are different from each other, and the input end part further includes a part inclined to the longitudinal and width directions. For example, as shown in the example of FIG. 1, the refractive index for microwave in the longitudinal direction "L" is different from that in the width direction "W" of the substrate body. The longitudinal direction "L" is parallel with Y axis and width direction "W" is parallel with Z axis of the signal crystal. Each of the input end parts 20A to 20D includes an inclined part 30, and each inclined part 30 is inclined with respect to the longitudinal direction "L" and the width direction "W" of the substrate body. Further, the substrate body may be composed of a Z-cut lithium niobate substrate. In the case that a Z-cut substrate is used, the refractive indices in the "L" and "W" directions are the same with each other.

It is thereby possible to minimize the electrical lengths of the input end parts on the substrate body. In the case that the input end portion on the substrate body is long, a deviation is caused among the production lots according to the reasons described above. It is thus beneficial to provide the inclined parts in the respective input end parts according to the viewpoint of further reducing the deviation among the production lots.

The inclined angle θ of the inclined part 30 with respect to the longitudinal direction "L" is not particularly limited, and may preferably be 15 to 75° and more preferably be 30 to 60°.

Further, the optical modulation substrate may be made of an electro-optic single crystal, which may preferably be lithium niobate, lithium tantalate, lithium niobate-lithium tantalate solid solution, potassium lithium niobate, KTP, GaAs, quartz or the like.

The planar pattern of the conductive lines in the electrical length adjusting substrate is not particularly limited, and may be U-shaped or crank shaped, or a curved shaped such as an arc.

The material of the signal electrode, ground electrode or conductive line is not particularly limited as far as it has a low resistance and good impedance characteristics, and may be a material such as gold, silver or copper.

Further, the thickness of the electrode is not particularly limited as far as the velocity matching of the micro and light waves can be attained, the thickness of the signal electrode may preferably be 1 μm or larger, and 3 μm or larger, particularly on the viewpoint of preventing the disconnection of the electrode and of providing a low electrode propagation loss. Further, the thickness of the signal electrode may preferably be 30 μm or smaller and more preferably be 10 μm or smaller, on the viewpoint of producing and forming the electrode at high precision, while preventing the deviation of the high frequency electrode characteristics and differences in the delay among the channels among the production lots.

On the other hand, the thickness of the conductive line may preferably be 10 μm or smaller, on the viewpoint of preventing the difference in the delay among the channels due to production. Since it is unnecessary to attain the velocity matching for the conductive lines, the lower limit of the thickness of the conductive line is not particularly defined as far as the electrical signals can be transmitted at a low loss, and it may be 0.5 μm or larger, for example. Further, it is preferred that the thickness of the conductive line is smaller than that of the signal electrode, and the difference of those may preferably be 1 μm or more.

The optical waveguide is formed in the optical modulation substrate, and may preferably be formed on the substrate surface side. The optical waveguide may be a ridge-type optical waveguide directly formed on a surface of the substrate, or a ridge-type optical waveguide formed on another layer on the surface of the substrate, or an optical waveguide formed inside of the substrate by inner-diffusion or ion exchange, such as titanium diffusion or proton exchange optical waveguide. The electrode is provided on the side of the substrate surface, and may be provided directly on the substrate surface or on a buffer layer.

The optical modulation and conductive line substrates may be adhered to separate supporting bodies, respectively. Although the kind of adhesive used is not particularly limited, the thickness of the adhesive may appropriately be 300 μm or smaller. Further a dielectric material suitable for the low dielectric constant layer may preferably be a material having a low dielectric loss (low tan θ) on the viewpoint of reducing the propagation loss of the high frequency modulation signal. Such a material having a low dielectric constant and low dielectric loss includes Teflon or an acrylic resin based adhesive. Further, another material of a low dielectric constant includes glass based and acrylic resin based adhesives, or an interlayer dielectric material for producing a semiconductor and a polyimide resin.

According to the present invention, the electrical lengths of the respective conductive films in the electrical-length adjusting substrate are made different from each other, so as to adjust the phase differences at the signal application point onto the interacting part. According to a preferred embodiment, the phase difference is made 2 psec or smaller at the signal application point onto the interacting part.

EXAMPLES

Example 1

The optical modulator described referring to FIGS. 1 to 3 was produced. Specifically, the optical modulation substrate 2 was made of lithium niobate single crystal, and the optical waveguide was formed by titanium diffusion. The signal and ground electrodes were made of gold and the thickness was 6 μm.

The material of the conductive line substrate 6 was alumina having a low dielectric loss at a high frequency. Gold conductive line patterns 9A to 9D were formed on the conductive line substrate 6. The gold conductive line patterns had a thickness of 2.5 μm. The conductive lines 9A to 9D were formed so that the electrical signals can be applied at the same timing among the four channels. The electrical length adjusting substrate 26 had an insertion loss of 0.3 dB.

The optical modulation substrate was mounted in a metal package 1, and the high frequency substrate 2, terminal resistances 11 and the respective channels were connected by wire bonding. The high frequency connectors 7A to 7D were composed of GPPO connectors supplied by Corning Gilbert Inc. and the four connectors were positioned in parallel at an interval of 3.6 mm.

Optical fibers were connected to the device by means of pig-tail connection and the optical modulation characteristics were observed using an optical component analyzer to prove that the optical modulation band was 30 GHz. Further, the optical component analyzer was used to measure the difference of the delay of the light to be modulated with respect to the input signal among the four ports. The difference of the delay among the ports was proved to be smaller than 1 psec at the maximum (measured at room temperature; 20° C.). The delay means a time required for the inputted electrical signal to propagate the conductive line from the high frequency input connector to the starting terminal of the interaction.

Further, the ambient temperature was changed in a range of 0 to 85° C. and the difference of the delay among the channels was measured to prove that the delay was 1.3 psec at the maximum. Further, the difference of the delay among the ports was measured at room temperature for the three samples taken from the different production lots to obtain values of 0.8, 1.1 and 0.9 psec.

Comparative Example 1

Figure 5:
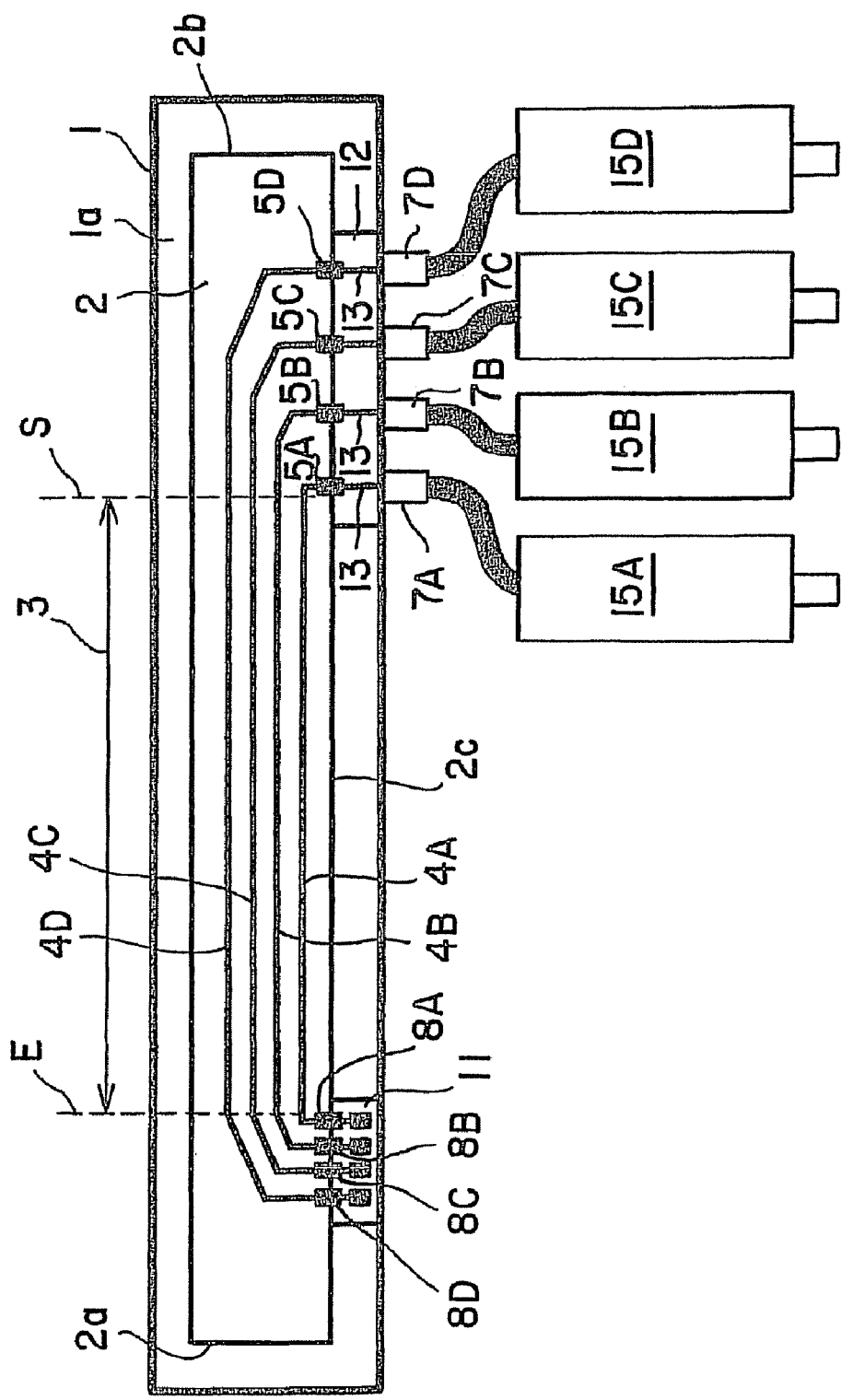
FIG. 5 is a schematic view showing an optical modulator according to a comparative example, in which the skew is controlled by means of variable phase shifters 15A to 15D.

The optical modulator as schematically shown in FIG. 5 was produced.

Specifically, according to the similar procedure as the example 1, the optical modulation substrate 2 and conductive line substrate 12 were produced. According to the present example, it was not adjusted the timing of the signal input with respect to the signal electrodes 4A to 4D of the channels in the optical modulation substrate 2. Therefore, the phase shifters 15A, 15B, 15C and 15D were connected to the respective channels to adjust the timing among the channels. The high frequency substrate 12 was provided between each phase shifter and each of the electrode input ports 5A to 5D, and the conductive line 13 was formed thereon. The conductive lines 13 are designed to transmit the high frequency electrical signal, having the same electrical length with each other and did not have the function of phase compensation.

Since the variable phase shifter is large with respect to the size of the device, an optical component analyzer including a high frequency cable required for the connection was used to measure the modulation band, which was proved to be 14 GHz. After the phase shifter was adjusted, the difference of the delay among the channels was measured and proved to be 2 psec at the maximum. The measurement was continued, and it was observed that the difference of the delay among the channels was increased to 5 psec with the deviation of the ambient temperature. The ambient temperature was deviated in a range of 20 to 25° C.

Comparative Example 2

Figure 6:
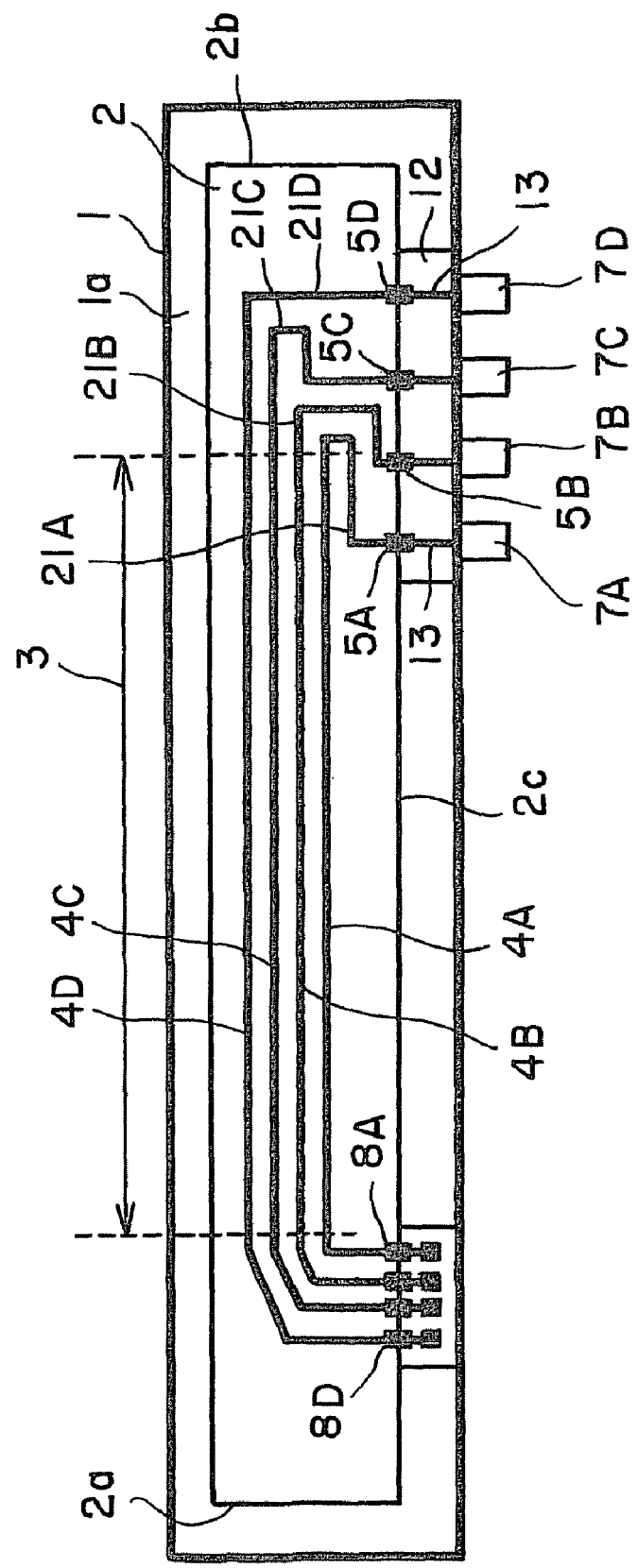
FIG. 6 is a schematic view showing an optical modulator according to a comparative example, in which the skew is controlled by means of input end parts 21A to 21D.

The optical modulator schematically shown in FIG. 6 was produced.

Specifically, the optical modulation substrate 2 and conductive line substrate 12 were produced according to the same procedure as the Example 1. According to the present example, for the signal electrodes 4A to 4D of the respective channels in the optical modulation substrate 2, the input end parts 21A, 21B, 21C and 21D are bent to adjust the timing of signal input into the interacting part. The variable phase shifter was thus omitted. The high frequency substrate 12 was provided between the input ports 7A to 7D and electrode input ports 5A to 5D, and the conductive lines 13 were provided on the substrate 12. The conductive lines 13 were provided only for transmitting the high frequency electrical signals, having the same electrical length and did not have the function of compensating the phase difference.

The modulation band of the optical modulator was measured and proved to be 18 GHz. Compared with the Example 1, the length of the conductive line between the high frequency input connector and the terminal of the interacting part provided on the optical modulator was as long as 8 mm. It was observed a propagation loss of 1.8 dB in the conductive line in this signal input part. It is considered that the propagation loss made the modulation band narrower.

Further, the difference of the delay among the channels was measured and proved to be 3 and 5 psec in the two channels. The reason is considered as follows. That is, the electrode thickness was set at 5 to 30 micron for the velocity matching in the interaction part of the optical modulator chip, so that it is difficult to reproduce the electrode shape at a high precision. As a result, the microwave characteristics of the electrodes were fluctuated among the production lots to result in a deviation of the difference of the delay among the channels.

Although particular embodiments of the present invention have been described above, the present invention is not limited to these embodiments and various changes and modifications may be made without departing from the appended claims.

The invention claimed is:

1. An optical modulator comprising an optical modulation substrate, an electrical length adjusting substrate, a package containing said optical modulation substrate and said electrical length adjusting substrate, and a plurality of input ports for inputting high frequency electrical signals;
    wherein said optical modulation substrate comprises a substrate body comprising an electro-optic material, a plurality of signal electrodes provided on said substrate body, optical waveguides propagating lights interacting with said signal electrodes, respectively, and electrode input ports inputting said high frequency electrical signals into said signal electrodes, respectively;
    wherein each of said signal electrodes comprises an interacting part interacting with said optical waveguide, an input end part provided between said electrode input port and said interacting part, and a terminal part provided in the downstream of said interacting part;
    wherein said electrical length adjusting substrate comprises conductive lines connected to said input end parts and said input ports for inputting said high frequency electrical signals, respectively; and wherein said conductive lines have electrical lengths different from each other.

2. The optical modulator of claim 1, wherein said high frequency electrical signals have a phase difference of 1 psec or less at signal application terminals of said interacting parts.

3. The optical modulator of claim 1, wherein said electrical length adjusting substrate comprises an isotropic material.

4. The optical modulator of claim 1, wherein said substrate body has refractive indices for a microwave in the longitudinal and width directions of said substrate body, said refractive indices being different from each other, and wherein said input end part comprises an inclined part inclined with respect to said longitudinal and width directions.

5. The optical modulator of claim 2, wherein said electrical length adjusting substrate comprises an isotropic material.

6. The optical modulator of claim 2, wherein said substrate body has refractive indices for a microwave in the longitudinal and width directions of said substrate body, said refractive indices being different from each other, and wherein said input end part comprises an inclined part inclined with respect to said longitudinal and width directions.

7. The optical modulator of claim 3, wherein said substrate body has refractive indices for a microwave in the longitudinal and width directions of said substrate body, said refractive indices being different from each other, and wherein said input end part comprises an inclined part inclined with respect to said longitudinal and width directions.

* * * * *